Figure 1:
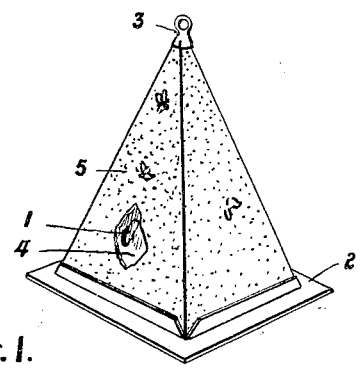

No. 897,919. PATENTED SEPT. 8, 1908.
G. A. H. MULLER.
MEANS FOR EXTERMINATING INSECTS AND OTHER VERMIN.
APPLICATION FILED MAY 8, 1907.

Witnesses.  Inventor.

UNITED STATES PATENT OFFICE.

GUSTAVE AUGUSTUS HENRY MULLER, OF ST. JOHN, NEW BRUNSWICK, CANADA.

MEANS FOR EXTERMINATING INSECTS AND OTHER VERMIN.

No. 897,919.   Specification of Letters Patent.   Patented Sept. 8, 1908.

Application filed May 3, 1907. Serial No. 372,580.

*To all whom it may concern:*

Be it known that I, GUSTAVE AUGUSTUS HENRY MULLER, British subject, residing at 20 Horsfield street, in the city of St. John, in the Province of New Brunswick, in the Dominion of Canada, have invented certain new and useful Improvements in Means of Exterminating Insects and other Vermin, of which the following is a specification.

My invention relates to means of exterminating insects and other vermin, and the object of the invention is to devise a means which shall attract the insects or animals so that they may be destroyed in any suitable manner, and whereby dangerous and obnoxious forms of insect and vermin killers may be dispensed with, and it consists essentially of the novel means employed whereby a cool luminant or light is utilized to attract the insects or animals to certain destruction, the preferable forms of the invention being set forth in detail in the present specification and shown in the drawings that form part of the same.

Figure 2:
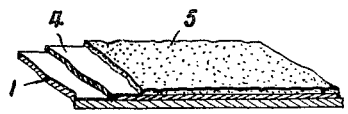
Figure 3:
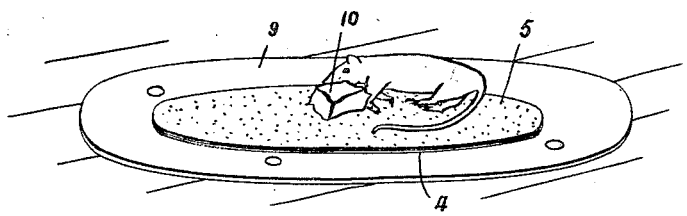
Figure 4:
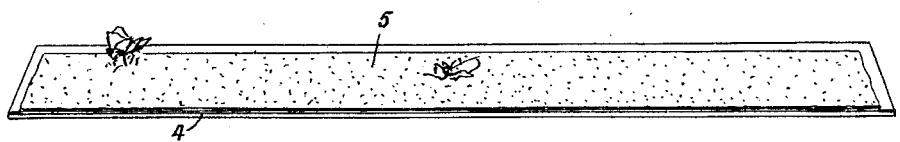

In the drawings, Figure 1 is a perspective view of a cardboard pyramid having the outside surface thereof painted with a cool luminant and also the upper side of its base and over the coat of luminant a coat of transparent sticky substance. Fig. 2 is perspective detail of a piece of cardboard broken away showing the three layers, viz:—of cardboard, luminous substance and sticky substance in exaggerated form. Fig. 3 is a perspective detail of a plate or dish of suitable material having a coating of cool luminant painted thereon and a poisonous bait placed in the center thereof. Fig. 4 is an exaggerated sectional view of a piece of sheet material showing the sheet material, a coating of luminant and the sticky substance on top of said layer of luminant substance.

Like numerals of reference indicate corresponding parts in each figure.

It is well known that all kinds of insects and rodents are attracted by light and particularly a luminous power created in a cool state, with or without combustion.

The most acceptable manner of operating my invention is to apply a coating of a luminous mixture to a card or other body having a surface which may be painted to prove as an attraction to the insects and to apply to the surface contiguous to the aforesaid surface, a smeary poisonous substance which will have the effect of entangling and, if necessary, poisoning the insect or rodent.

The luminous substance used in this invention is preferably a mixture of chemicals which will at night-time and in the dark show as a brilliant blue light, while in the day-time it will absorb light.

It is not essential to the invention as to the particular ingredients making up this luminous substance, though it has been proved in practice that the blue light is more efficacious in luring the insects and animals to destruction. The said substance may be made with a calcium, barium sulfid base or phosphorous base, probably the former, but in preparing a luminous surface I use a paint which is not necessarily of my own mixing, as these luminous substances or paints have been much improved and at the present time can be obtained in a proper state to use for my purpose.

The adhesive substance is a substance such as commonly used now on sticky fly paper, but any sticky substance which will remain sticky and at the same time be transparent will answer the purpose.

Referring to the drawings, 1 is a pyramid constructed of cardboard in any suitable manner and standing on the base 2 and having fastened to the apex thereof the cap 3, the said cap joining the sides of the said pyramid and forming the grip, or handle for lifting the structure from one place to another. The walls of the pyramid have their surfaces covered with a cool luminant 4 preferably painted thereon. Over the coating of the cool luminant substance, a transparent and sticky substance 5 is spread, so that the luminant shows through the said sticky substance 5.

In Fig. 2 the arrangement of the cardboard, the cool luminant substance and the sticky substance is more particularly shown.

In Fig. 3 a plate 9 or disk of cardboard is shown securely nailed to flooring and having a coating of the cool luminant substance applied thereon and over that a substance with stronger adhesive properties than the sticky substance mentioned in the foregoing, though of transparent nature to permit the luminant to shine therethrough. In the center of the plate is a poisonous bait 10 placed in order to tempt the vermin on to the adhesive substance and so that on reaching the bait and nibbling thereat the said vermin shall not be able to get away readily to die in some forgotten corner and thus pollute the atmosphere.

In Fig. 4 a sheet of suitable material is covered over with a coating of a cool luminant substance and the transparent sticky substance there on top and is particularly applicable for the attraction and entangling of the ordinary house-fly and mosquito.

It will be seen that the cool luminant is a great power in the working out of this invention and it is of no particular importance what form of construction is used, so long as the luminant appears through the sticky substance.

Many forms of the cool luminant may be used, such as materials having phosphorescent or like properties, as long as it does not cause or create heat. Such a luminant will have the effect of attracting all sorts of obnoxious vermin, and as explained in the foregoing after attraction any sticky method may be used for insnaring them or trapping them with a view to extermination.

Preferably I apply over the surface of the luminant substance resin, castor oil and some essential oil which throws off a pleasant perfume and this will prove very effective in destroying such insects as mosquitoes, flies, beetles and such like.

What I claim as my invention is:—

1. In a means for exterminating insects and other vermin, the combination with a suitable backing, of a substance having light radiating and light absorbing properties and spread over the surface of said backing and a transparent adhesive substance spread over said luminous substance continuously in a sticky condition and through which the light radiates from the said luminous substance, substantially as described.

2. In a means for exterminating insects and other vermin, the combination with a backing of paper material, of a dry luminous substance radiating light without combustion and forming a coating on the surface of said paper material and a transparent sticky substance spread over said luminous substance and continuously in a sticky condition and forming with said paper material and luminous substance a composite sheet of three layers, substantially as described.

Signed at the city of St. John, in the Province of New Brunswick, in the Dominion of Canada, this thirteenth day of April, 1907.

GUSTAVE AUGUSTUS HENRY MULLER.

Witnesses:
JACK M. FAIRWEATHER,
JOSEPH MARRY.